(12) United States Patent
McCall et al.

(10) Patent No.: US 10,871,141 B2
(45) Date of Patent: Dec. 22, 2020

(54) VERNIER PERMANENT MAGNET LINEAR GENERATOR

(71) Applicant: Dehlsen Associates LLC, Santa Barbara, CA (US)

(72) Inventors: Alan L. McCall, Santa Barbara, CA (US); Patrick J. McCleer, Holland, MI (US); Gerald R. Shannon, Jr., Jackson, MI (US)

(73) Assignee: Dehlsen Associates, LLC, Santa Barbara, CA (US)

( * ) Notice: Subject to any disclaimer, the term of this patent is extended or adjusted under 35 U.S.C. 154(b) by 0 days.

(21) Appl. No.: 16/666,032

(22) Filed: Oct. 28, 2019

(65) Prior Publication Data

US 2020/0063707 A1 Feb. 27, 2020

Related U.S. Application Data

(63) Continuation-in-part of application No. 16/253,118, filed on Jan. 21, 2019.

(Continued)

(51) Int. Cl.
*F03B 13/18* (2006.01)
*H02K 7/18* (2006.01)

(52) U.S. Cl.
CPC ....... *F03B 13/1845* (2013.01); *H02K 7/1869* (2013.01); *F05B 2220/707* (2013.01); *F05B 2220/7068* (2013.01)

(58) Field of Classification Search
CPC ........ F05B 2220/7068; F05B 2220/707; F05B 2260/821; F05B 2270/20; F03B 13/20; F03B 15/00; F03B 13/1855; H02K 7/1869

(Continued)

(56) References Cited

U.S. PATENT DOCUMENTS 6,020,653 A * 2/2000 Woodbridge ....... F03B 13/1865
290/42
7,405,489 B2 * 7/2008 Leijon ................... F03B 13/189
290/42

(Continued)

FOREIGN PATENT DOCUMENTS

WO WO-2015176057 A1 * 11/2015 ............. F03B 17/06

*Primary Examiner* — Charles Reid, Jr.
(74) *Attorney, Agent, or Firm* — Felix L. Fischer

(57) ABSTRACT

A Vernier permanent magnet linear generator employs a translator having a plurality of translator modules oriented in a vertical array. At least a portion of the plurality of translator modules has permanent magnets. Supports at lateral edges of the plurality of translator modules and a rod connected to the supports attach the translator to a driving element. The driving element reciprocating the translator in a longitudinal direction. Two stators are supported on a reaction body oppositely spaced from the vertical array of translator modules by an air gap and offset by one half slot pitch. The stators have three phase integral-slot stator windings magnetically interacting with a magnetic field induced by the permanent magnets. A slot depth of the stators is configured such that an $11^{th}$ harmonic component of the magnetic field is saturated at a multiple value of a $1^{st}$ harmonic component.

19 Claims, 16 Drawing Sheets

Related U.S. Application Data

(60) Provisional application No. 62/621,377, filed on Jan. 24, 2018.

(58) Field of Classification Search
USPC .................................................. 290/42, 53
See application file for complete search history.

(56) References Cited

U.S. PATENT DOCUMENTS

| | | | | |
|---|---|---|---|---|
| 8,105,052 B1* | 1/2012 | Hill, Jr. | .................. | F04B 17/00 |
| | | | | 417/331 |
| 2007/0075593 A1* | 4/2007 | Petro | ...................... | H02K 21/12 |
| | | | | 310/12.14 |
| 2008/0295509 A1* | 12/2008 | Bernitsas | ................ | F03B 17/06 |
| | | | | 60/497 |
| 2009/0066087 A1* | 3/2009 | Van Huffel | ............. | F03B 17/06 |
| | | | | 290/54 |
| 2010/0084869 A1* | 4/2010 | Leijon | ................. | F03B 13/1865 |
| | | | | 290/53 |
| 2011/0193347 A1* | 8/2011 | Leijon | ................. | F03B 13/1865 |
| | | | | 290/53 |
| 2011/0198850 A1* | 8/2011 | Stromstedt | .......... | F03B 13/1815 |
| | | | | 290/53 |
| 2013/0062889 A1* | 3/2013 | Thoresen | ................ | F03B 13/12 |
| | | | | 290/1 R |
| 2013/0067904 A1* | 3/2013 | Leijon | ...................... | F16F 1/40 |
| | | | | 60/506 |
| 2013/0127167 A1* | 5/2013 | Dore | ................... | F03B 13/1885 |
| | | | | 290/53 |
| 2013/0140824 A1* | 6/2013 | Leijon | ..................... | B66D 1/36 |
| | | | | 290/53 |
| 2016/0252071 A1* | 9/2016 | Phillips | ................... | F03B 13/20 |
| | | | | 290/50 |
| 2017/0009732 A1* | 1/2017 | Mundon | ............... | H01L 41/125 |
| 2017/0198401 A1* | 7/2017 | Phillips | ................ | H02K 7/1853 |

* cited by examiner

VERNIER PERMANENT MAGNET LINEAR GENERATOR

This application is a continuation in part of application Ser. No. 16/253,118 filed on Jan. 21, 2019 claiming priority of U.S. provisional application Ser. No. 62/621,377 filed on Jan. 24, 2018 entitled POWER TAKE-OFF FOR A WAVE ENERGY CONVERTER, the disclosures of which are incorporated herein by reference.

BACKGROUND

Field of the Invention

The present invention relates to the extraction of electrical power from a linear oscillatory mechanical input with multiple frequency components, more specifically a double air gap, Vernier permanent magnet linear generator and for use as a power take-off of an ocean Wave Energy Converter (WEC).

Description of the Related Art

There is a vast resource of energy within the world's oceans. The movement of water in the world's oceans creates a vast store of kinetic energy, or energy in motion. This energy is embodied in currents, thermal gradients, or as is of principal interest of this invention, wave motion. A device capable of economically extracting the energy of ocean waves would be capable of providing a significant portion of the world's energy needs if widely deployed. Experimental devices exist and are known as Wave Energy Converters (WECs).

A WEC Power Take-off (PTO) is the means of extracting mechanical energy from the ocean and converting it into electrical energy. Such a system includes both software (controls) and hardware (gearboxes, linkages, powertrains, generators, etc.).

WECs have often been equipped with relatively simple controllers, providing a mechanical damping coefficient to maximize power from the dominant wave frequency only. On the hardware side, WEC PTOs often implement hydraulics as a method of transmitting and converting linear motion induced by wave energy extraction.

Wave Energy Converters face significant technical and economic challenges because wave energy, unlike other renewables, must be collected from an extremely dynamic resource. Ocean waves are not a simple, single frequency wave, but rather the superposition of countless frequency and amplitude waves. As a result, a Wave Energy Converter must be able to extract energy efficiently from a wide frequency spectrum and change operating conditions on a second or sub-second time scale for maximum energy extraction.

SUMMARY

The present invention relates to a Vernier permanent magnet linear generator with a translator having a plurality of translator modules oriented in a vertical array. At least a portion of the plurality of translator modules has permanent magnets. Supports at lateral edges of the plurality of translator modules and a rod connected to the supports attach the translator to a driving element. The driving element reciprocating the translator in a longitudinal direction. Two stators are supported on a reaction body oppositely spaced from the vertical array of translator modules by an air gap and offset by one half slot pitch. The stators have three phase integral-slot stator windings magnetically interacting with a magnetic field induced by the permanent magnets. Specifically, the $11^{th}$ space harmonic of the air gap magnetic field due to the stator winding current is synchronous in time and space with the fundamental ($1^{st}$ harmonic) component of the field due to translator permanent magnets.

In one implementation, Vernier permanent magnet linear generator provides a power take off for a wave energy converter with a floating body and a reaction body engaging the floating body. The reaction body is static or oscillating out of phase relative to the floating body and the floating body provides the drive element for the Vernier permanent magnet linear generator with the stator supported on the reaction body.

BRIEF DESCRIPTION OF THE DRAWINGS

The present invention may be better understood, and its numerous features and advantages made apparent to those skilled in the art by referencing the accompanying drawings. For ease of understanding and simplicity, common numbering of elements is employed where an element is the same in different drawings.

DETAILED DESCRIPTION

The following is a detailed description of illustrative implementations of the present invention. As these implementations of the present invention are described with reference to the aforementioned drawings, various modifications or adaptations of the methods and or specific structures described may become apparent to those skilled in the art. All modifications, adaptions, or variations that rely upon the teachings of the present invention, and through which these teachings have advanced the art, are considered to be within the spirit and scope of the present invention. For example, the device set forth herein has been characterized as a Wave Energy Converter Power Take-off, but it is apparent that other uses may be found for this device. Hence, these drawings and descriptions are not to be considered in a limiting sense as it is understood that the present invention is in no way limited to the implementations illustrated.

Figure 1:
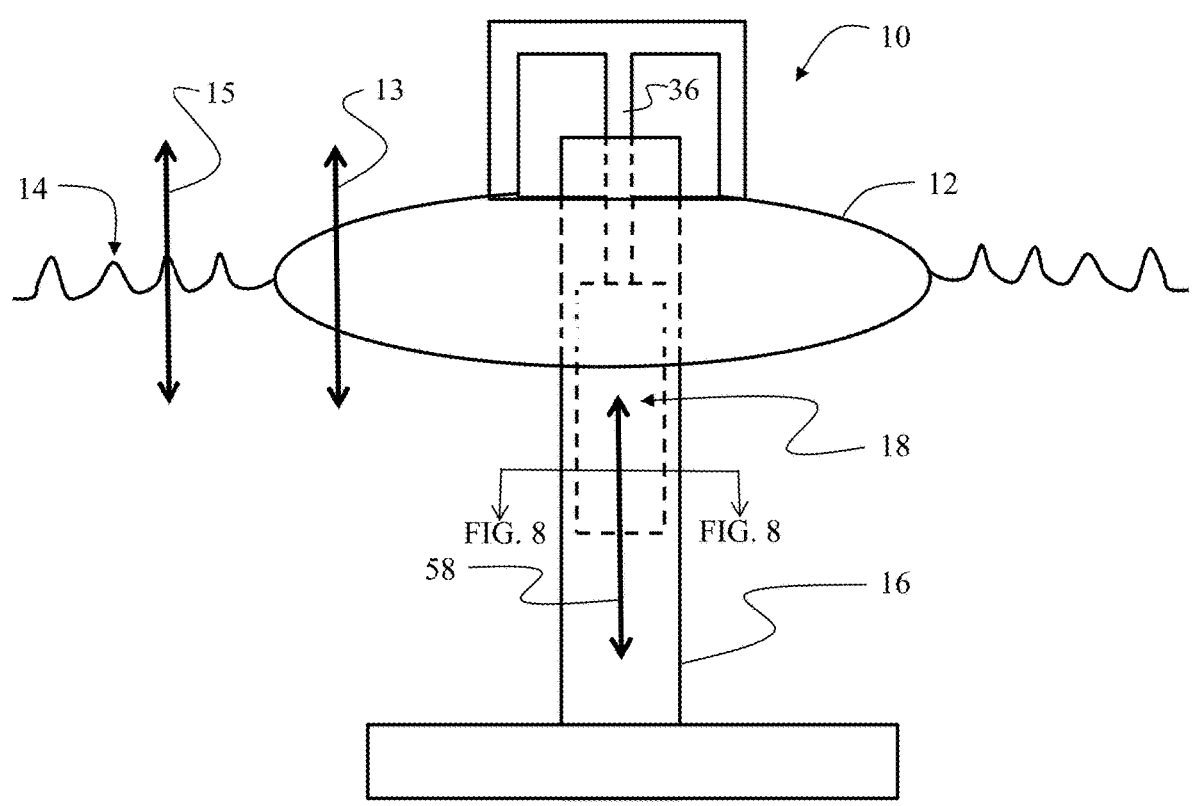
FIG. 1 is a side view of an example Wave Energy Converter incorporating an implementation of a PTO system.
Figure 2:
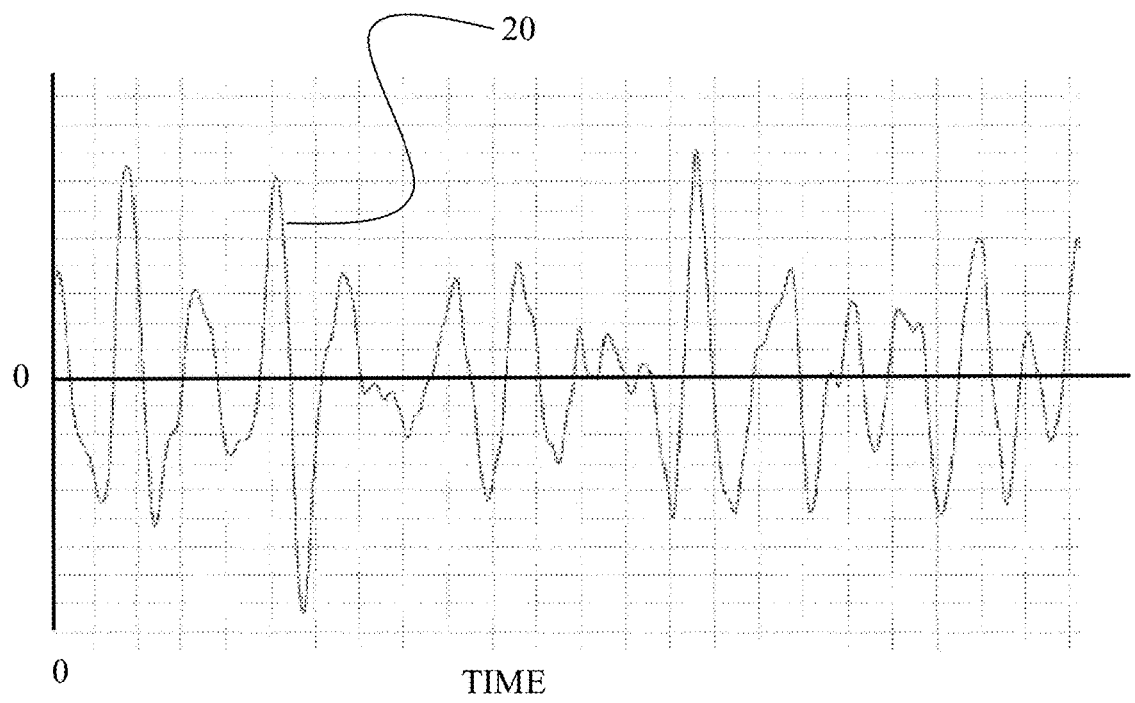
FIG. 2 is an example time series of a typical operating sea state.

The implementations presently disclosed provide a Power Take-off (PTO) system for use in an ocean Wave Energy Converter (WEC). For purposes of illustration, an example two body WEC is presented in FIG. 1. This is a point-absorber type WEC 10 with capability of extracting energy in a vertical (or heave) direction. A wave activated floating body 12 oscillates in the heave direction (as represented by arrow 13) as force (depicted by arrow 15) is imparted upon it by the waves in the ocean water depicted as element 14. An exemplary time series 20 of the motion of the water waves 14 is depicted in the graph of FIG. 2. The floating body 12 is engaged by and reacts against a reaction body 16 which is either static or oscillating out of phase relative to the floating body. The forces between the two bodies are transmitted through a PTO device 18. Most WEC PTOs are either limited by a lack of optimal controls, a lack of capability in their generator and power train system, or both.

In the case of a lack of control, the high level control of the WEC does not have the sufficient formulation or information to predict and command the optimal operating state for the generator and power train system. For example, a controller that is designed to sense the dominant frequency component of a sea state and command a desired damping value for the generator does not have the capability to command the generator to optimally extract power from any frequency components other than the detected dominant frequency. Moreover, the controller may not have adequate sensor information to even be aware of the energy available in other wave frequency components. FIG. 2 is presented to provide a visual understanding of a time series of a typical operating sea state containing multiple frequency components.

In the case of a lack of capability of a generator and power train system, even if the controller had perfect information relating to the optimal operating state of the generator at present and in the short-term future, the generator and power train system may not be capable to act on such information. For example, if a controller wished to command a certain generator and power train system to quickly change operating state in order to capture available energy in an upcoming higher frequency component of a wave, the generator and power train system may have excessive inertia or insufficient operating force capability to change operating state in a timely manner.

Figure 3:
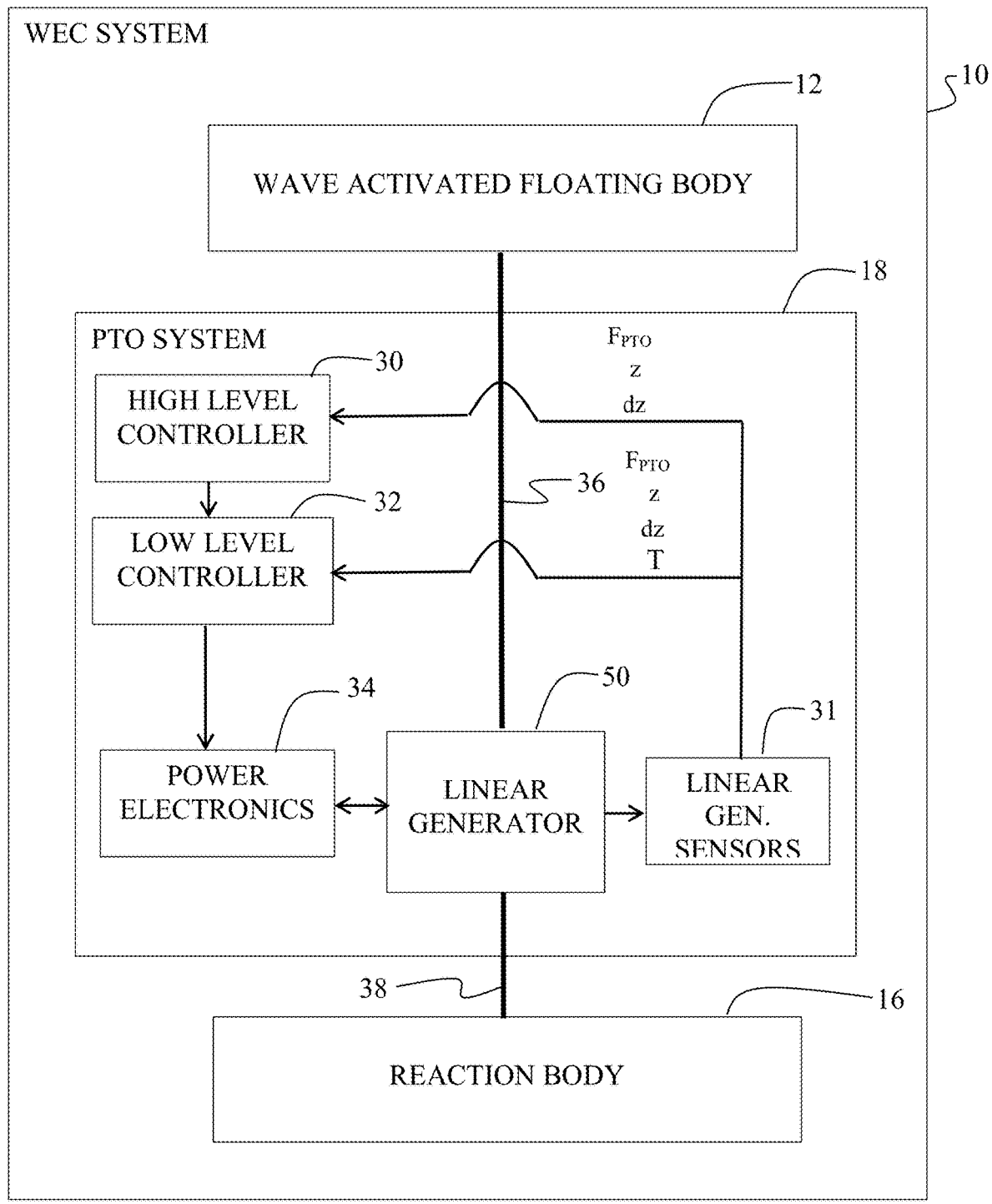
FIG. 3 is a block diagram of the PTO system integrated with an example WEC system.

The presently disclosed implementation solves these problems by utilizing an entire, integrated Power Take-off system containing a purpose built high level control, low level control, power train, and electrical generator all working together optimally. The full system is outlined as it would be utilized in the example WEC 10 from FIG. 1 in the block diagram of FIG. 3. In an exemplary implementation, a direct drive linear electric generator 50 (to be described in greater detail subsequently with respect to FIGS. 5 and 6) is utilized in the PTO 18, and therefore the power train and generator are consolidated into a single element with no need for a gearbox or transmission. As can be seen in FIG. 3, the implementation disclosed incorporates several components, each of which will be described with their interactions with the other subcomponents outlined.

Figure 4:
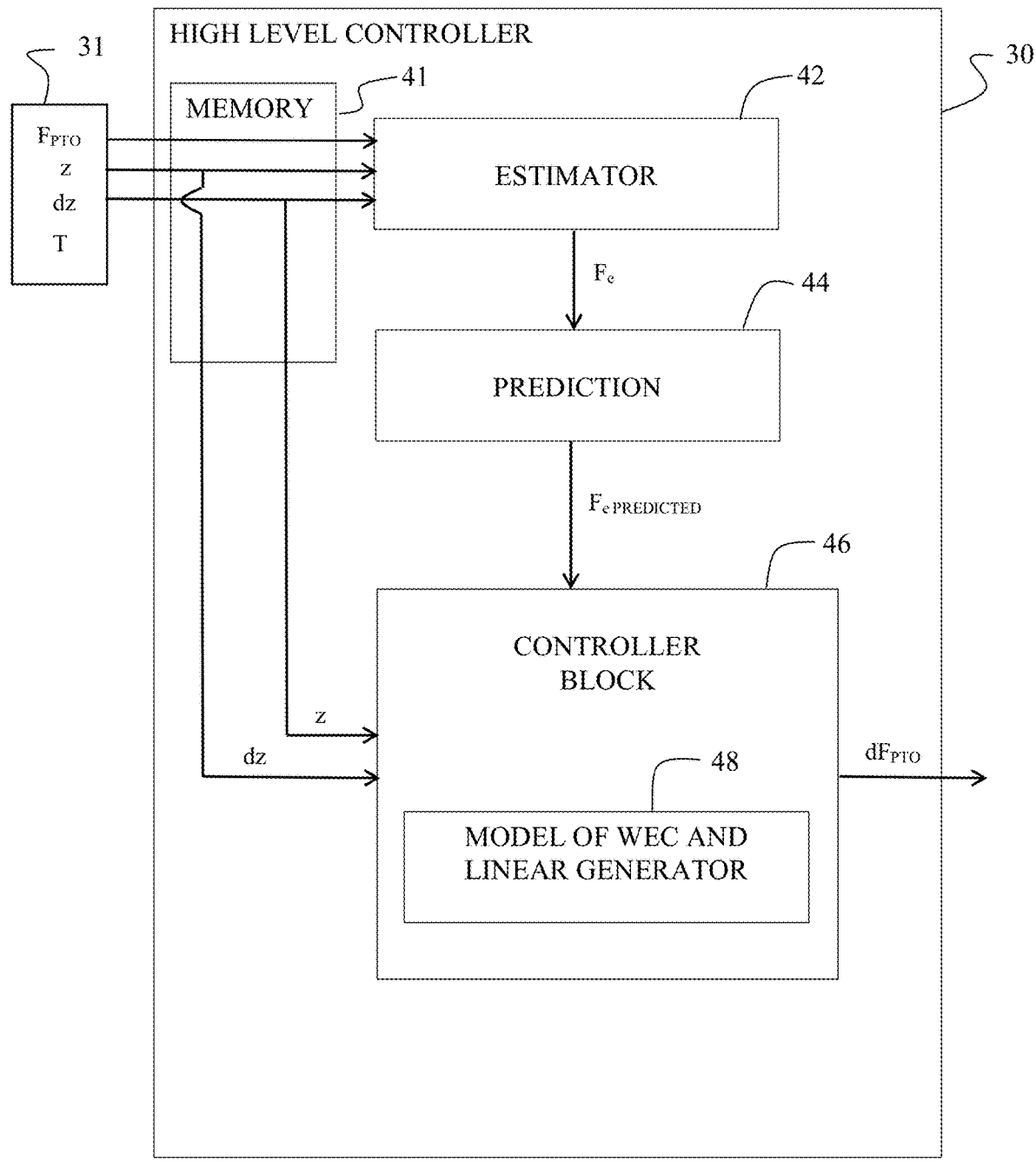
FIG. 4 is a block diagram of the high level controller.

A high level controller 30, such as a computer having either a general purpose processor or single purpose processor utilizing one or more core sections with a readable memory 41, for processing calculation modules (which may be implemented in hardware or software subroutines). The high level controller 30 contains several modules as shown in FIG. 4. Specifically, the high level controller 30 contains an estimator block 42, a prediction block 44, and a control block 46. Further, the control block 46 includes a model 48 of the WEC 10 and the linear generator 50 including the mass and hydrodynamic properties of each body. One or more sensors 31 associated with the linear generator 50 transmit a signal to the high level controller 30 which includes the present force (Fpto) applied between the linear generator 50 and the wave activated floating body 12, the position (z) of a translator 54 relative to one or more stators 52 of the linear generator 50 and the rate of change of this position (dz). This data is collected and stored in the computer readable memory 41 which can be accessed by the high level controller 30, creating a data store of time indexed sensor values. While Fpto and z must be transmitted to the high level controller 30, dz may also be calculated based on the time series data of z.

The estimator block 42 uses Fpto, z, and dz along with knowledge of the Wave Energy Converter's physical properties to calculate the estimated excitation force (Fe) impacted upon the wave activated body by the sea.

The prediction block 44 uses the time series history of Fe output by the estimator block 42 as an input to an auto-regressive model to calculate a prediction of future Fe over a specified time horizon.

Finally, the control block 46 uses the future prediction of Fe output from the prediction block 44 with the current states of z and dz as transmitted from the linear generator sensors 31, and the numerical model 48 of the WEC and linear electric generator to predict the WEC and linear generator's response to the future excitation force imparted by the wave action the ocean water. With the ability to model the future response of the WEC given the predicted Fe over a certain time horizon, the control block 46 then utilizes an optimization function to select a set of change of PTO force ($dF_{PTO}$) commands over a specified time horizon to maximize electrical power extraction. The commanded $dF_{PTO}$ is then sent to the low level controller 32.

As represented in FIG. 3, the low level controller 32 receives the high level controller 30 and linear generator sensors 31 outputs, and then computes and commands appropriate action from the power electronics 34 which in turn drive the linear generator 50.

The linear generator 50 is capable of acting on the desired control commands in order to achieve optimal power extraction performance of the WEC system. The general nature of these control commands is highly variable in operational state from second to second and typically requiring high force at low speed with operation in two physical directions and operating as both a motor and a generator for a total of four quadrants of control. The linear generator 50 in the disclosed implementation is a direct drive permanent magnet linear generator which receives control commands and adapts to new operating states on a sub-second time scale. The linear generator 50 is designed as a module which can be combined in parallel or series as shown in the detailed view of FIG. 5 by mechanically linking a plurality of stators 52 in series such that lateral edges 53 of the stators are flush with one-another creating a single electric machine suitable for the maximum force requirement of the specific WEC. Similarly, a translator 54 having a plurality of modules 55 is mechanically connected at lateral edges 56 of the modules to form a single mechanical body matching the length of the stators plus excess length 59 in a direction of oscillatory travel 58 which is determined to meet the desired stroke length requirement of the WEC. For the exemplary implementation, the translator 54 is connected to the wave activated floating body 12 as a driving element with an arm or rod 36 (seen in FIG. 1) while the stators 52 are linked to the reaction body 16.

Figure 5:
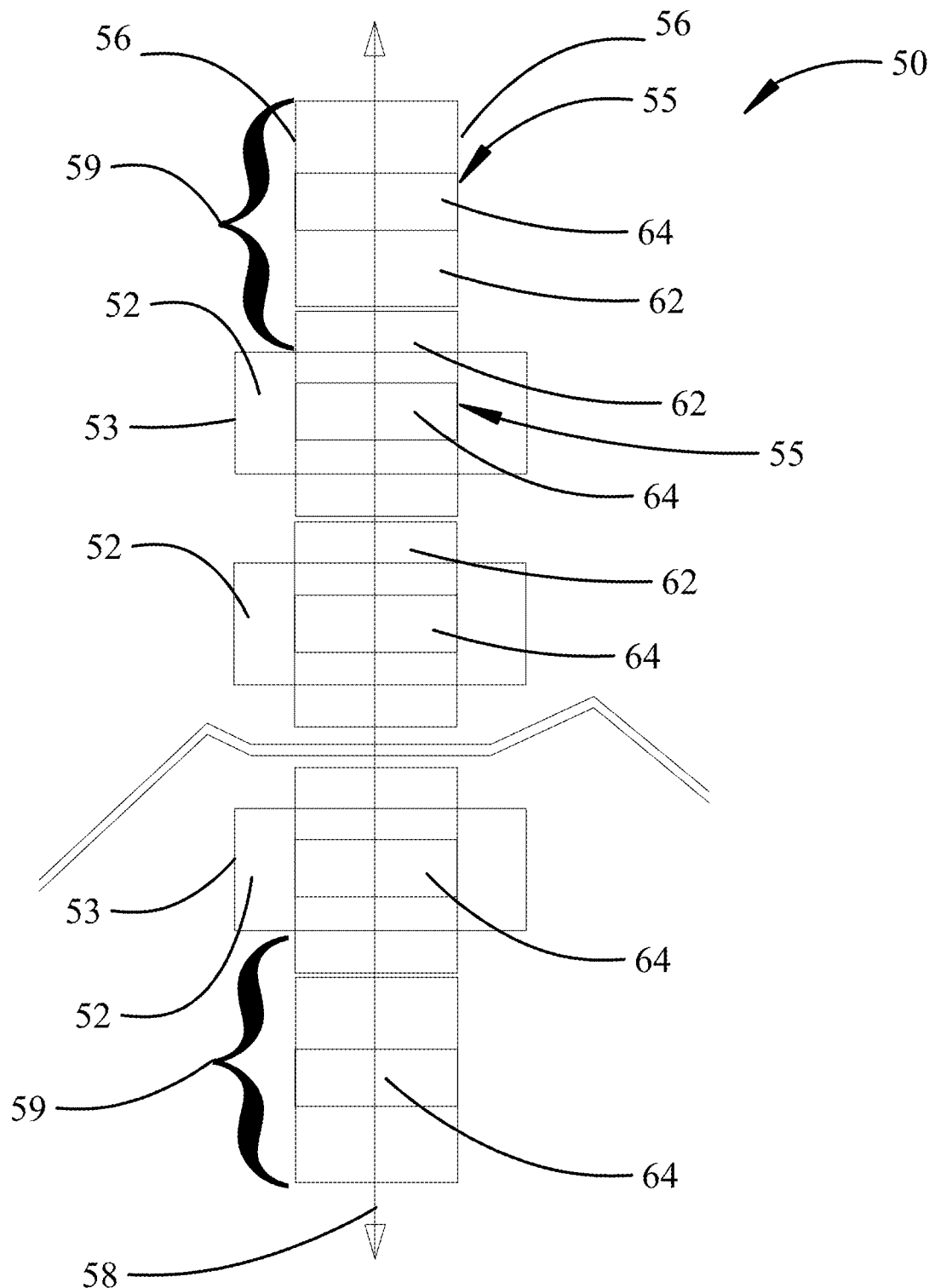
FIG. 5 is detailed view of the stator and translator modules forming a complete linear electric motor generator.
Figure 6:
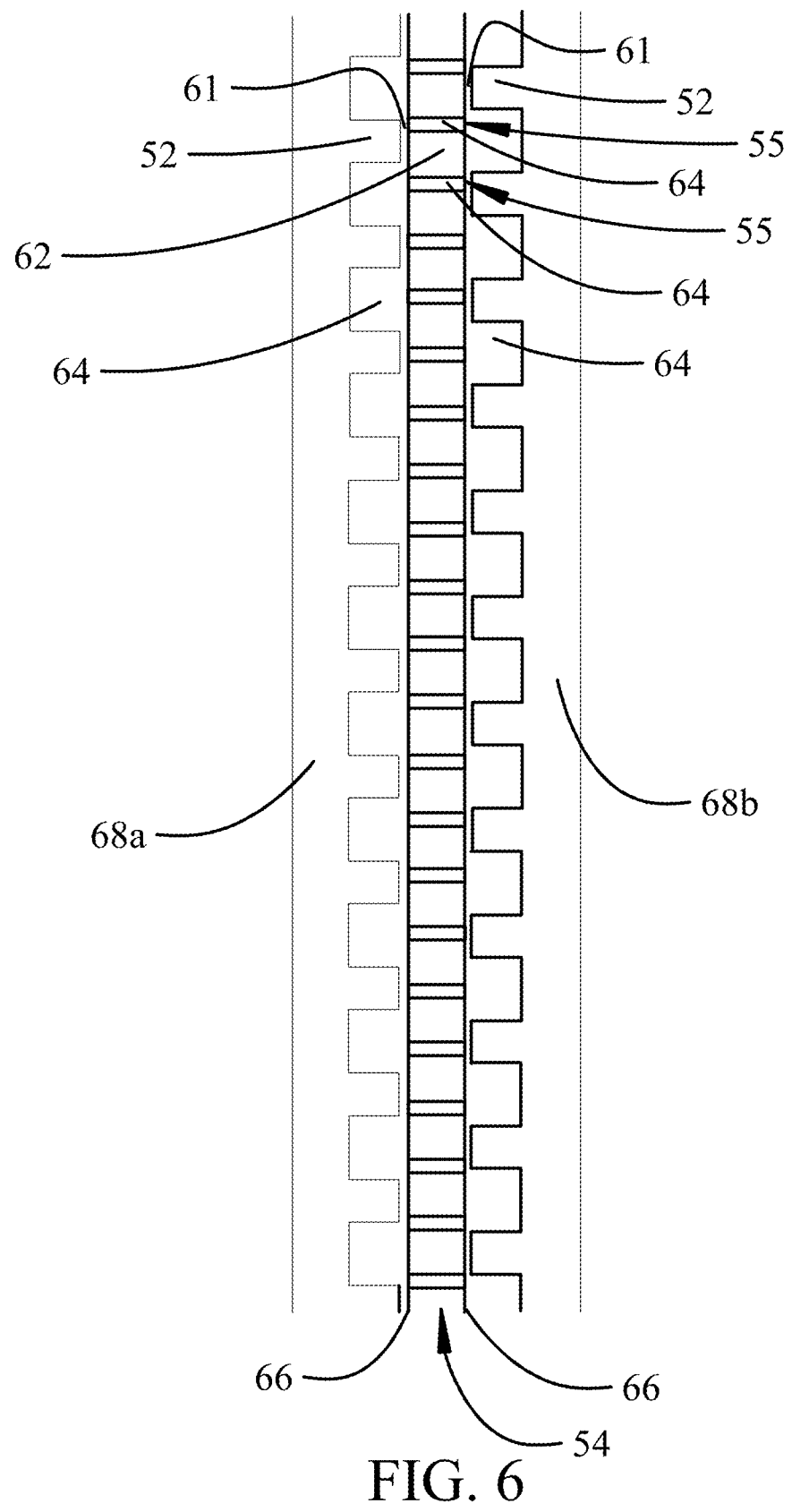
FIG. 6 is an overall depiction of the Vernier permanent magnet linear generator structure.

In one implementation of this invention, the linear generator 50 is specifically a Vernier Permanent Magnet linear Generator (VPMLG). This machine, as depicted in FIG. 6, is a permanent magnet synchronous electrical machine that utilizes higher order space harmonics of the magnetic field in the air gap 61 due to multiphase stator winding currents that are contained in open slots 64 at the air gap surface of the stators 52. The translator 54 must move smoothly between the two stator surfaces, while maintaining the active air gap at a near constant value, constant to within fractions of a mm variation. The air gap length itself will have values of low order millimeters, for example between 1 and 5 mm. Standard or conventional permanent magnet synchronous machines employ only the fundamental component of the air gap magnetic field due to the slotted stator winding currents. By contrast, the present implementation has a dual stator permanent magnet linear generator, with stators 52 providing coils oppositely spaced on both sides of a central permanent magnet translator 54. The translator 54 is formed by a stack of electrical steel laminations 62 and permanent magnets 65 forming translator modules 55 which are joined by supports 66 interconnected to the rod 36. The permanent magnets 65 are oriented with their poles facing the direction of travel 58 rather than facing the airgap surface of the stator modules. In the exemplary implementation the poles alternate polarity orientation. The stators 52 are maintained in two separate pluralities in opposing stator supports 68a and 68b and are offset from one another on opposing sides by one half slot pitch. Stator supports 68a and 68b are supported by or rigidly connected to structure of the reaction body 16 as represented by element 38 in FIG. 3. Both sets of stators 52 on the opposing stator supports 68a, 68b utilize the common translator 54 in order to optimally engage the magnetic flux. While the translator modules 55 are shown in FIG. 5 as evenly dimensioned with the stators 52 for convenience in depiction, the translator modules 55 are cyclically offset from the stators 52 as shown in FIG. 6 in the exemplary implementation employing a VPMLG.

Figure 7:
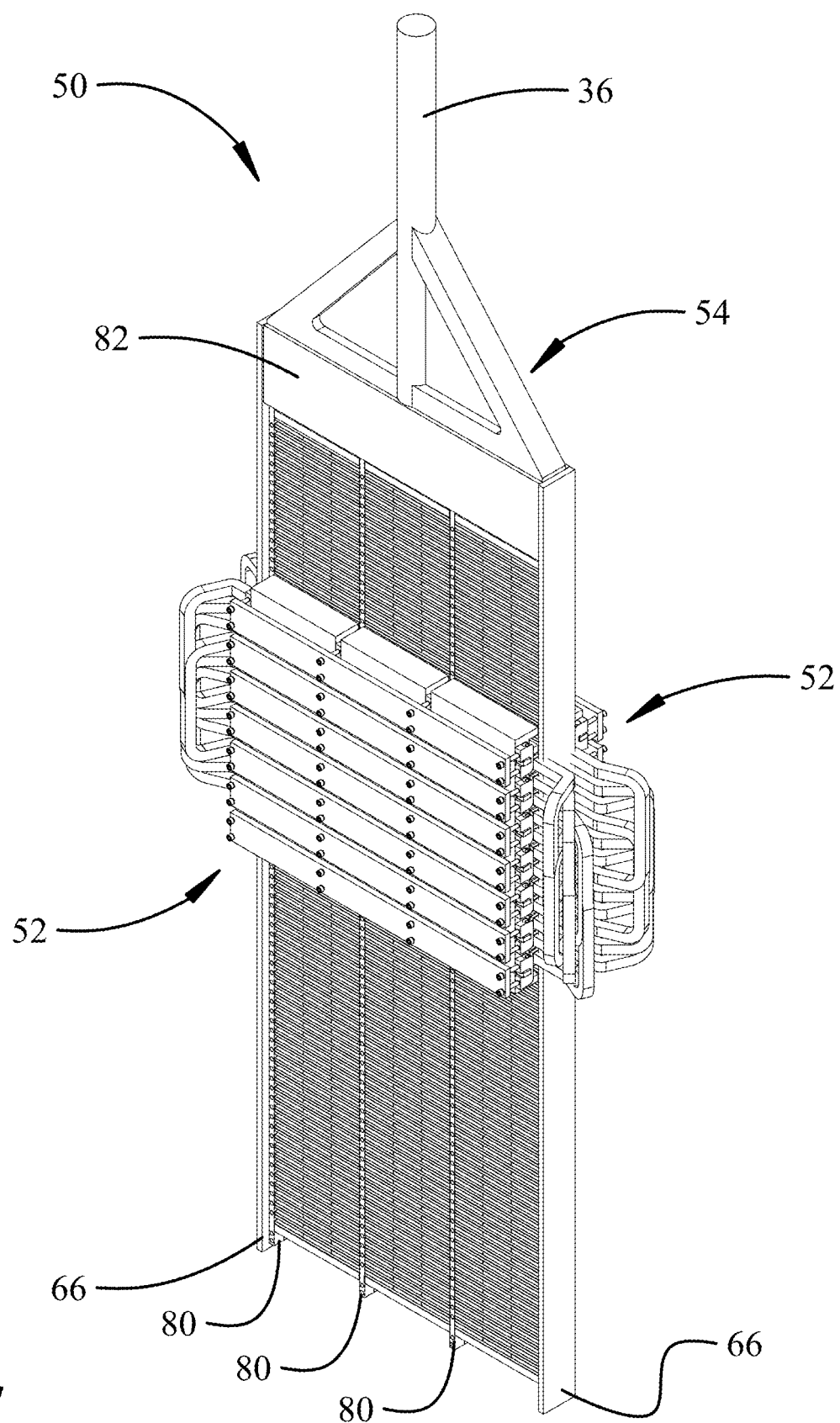
FIG. 7 is a detailed pictorial representation of an implementation of the Vernier permanent magnet linear generator.
Figure 8:
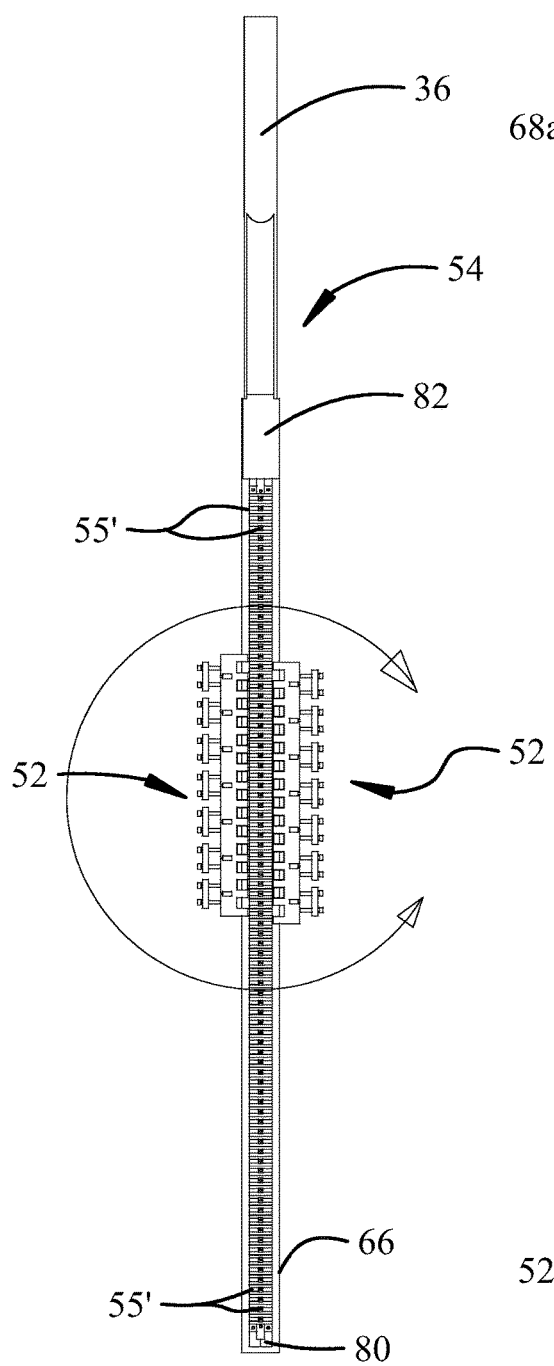
FIG. 8 is a side view of the Vernier permanent magnet linear generator with structural elements removed to disclose the interior elements.
Figure 9:
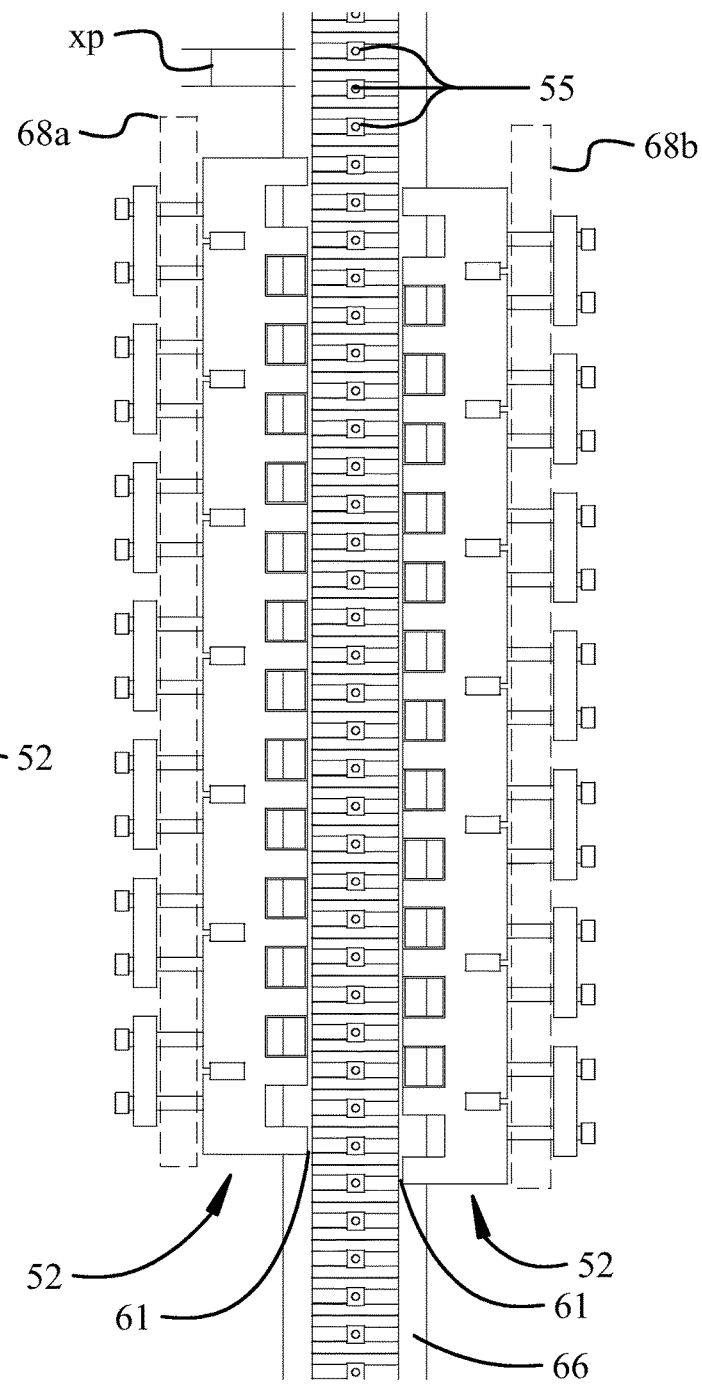
FIG. 9 is an expanded view of the stator and translator elements.
Figure 11:
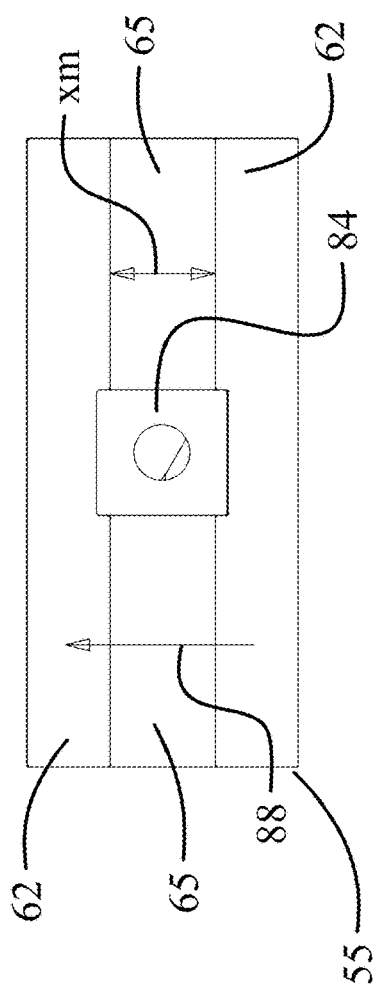
FIG. 11 is an end view of the translator module of FIG. 10.
Figure 10:
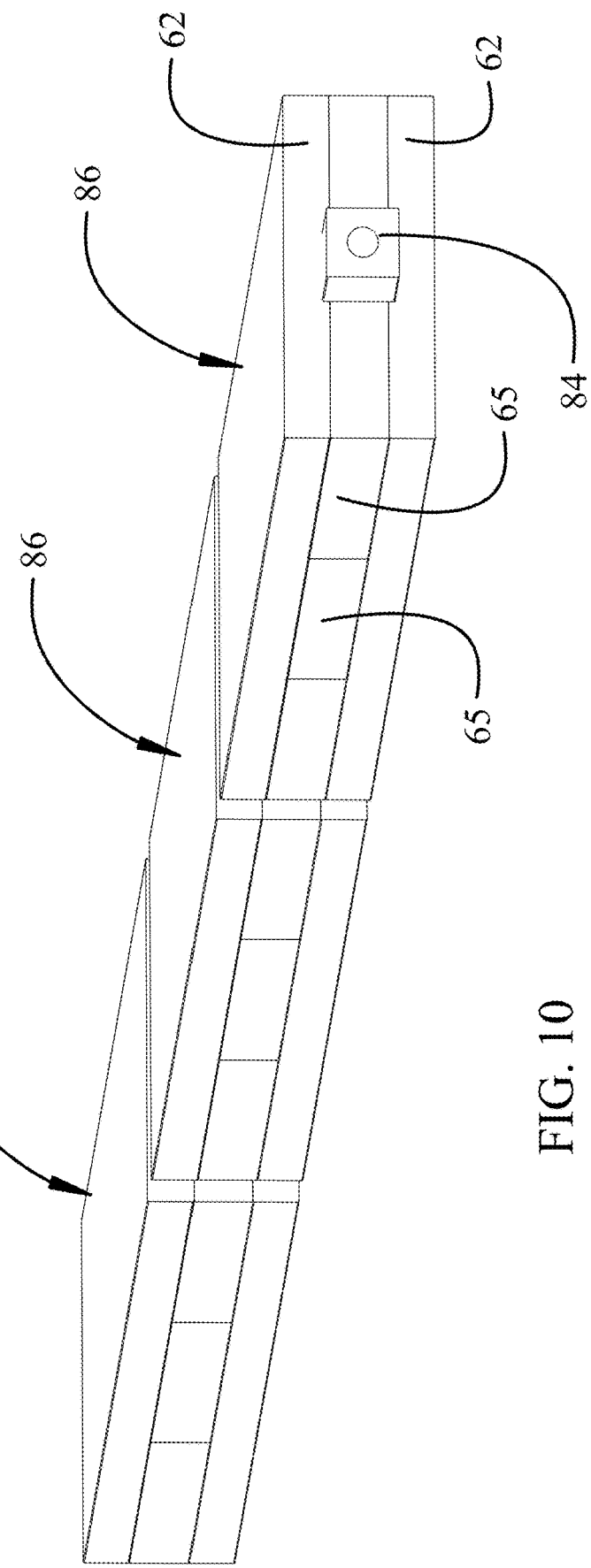
FIG. 10 is a pictorial representation of one translator module.

A detailed depiction of the implementation of the VPMLG is shown in FIGS. 7, 8 and 9. As seen in FIG. 7, a cross member frame structure, constructed of non-magnetic and poorly electrically conductive stainless steel bars of sufficient cross section, is imbedded within the translator body and at the translator edges outside of the machine active air gaps. Finger bars 80 to support the plurality of translator modules 55 in a fixed vertically orientated array are provided at each end of the modules and at one or more low integer number of fixed intervals in the stack length direction, as will be described in greater detail subsequently. The supports 66 abut the outer finger bars 80 and connect through a head boss 82 to the rod 36. All the gravitational force (due to the translator body mass) and all the longitudinal magnetic forces on the translator (due to the machine operation as a motor or a generator) will be transferred to and sustained by this frame. The total volume of the translator body, including the support frame, for this practical machine construction, would only be marginally larger than that of a similarly rated, idealized translator body with no support frame and only constructed with active magnets and laminations.

The translator modules 55 are shown in detail in FIGS. 10-13. A previously described, each translator module 55 in at least a portion of the plurality of translator modules incorporates electrical steel laminations 62 oppositely engaged on permanent magnets 65 to form a laminated assembly. The steel laminations 62 and permanent magnets 65 are joined on a pole bar 84 in a plurality of segments 86, to accommodate intervening longitudinal structural supports, with a plurality of magnets 65 in each segment. The steel laminations 62 support and constrain the plurality of magnets 65 in each module 55. In the exemplary implementation three segments 86 are employed with six magnets 65 (three on each side of the pole bar 84) in each segment. In alternative implementations the number of segments and number of magnets in each segment may be altered.

Figure 12:
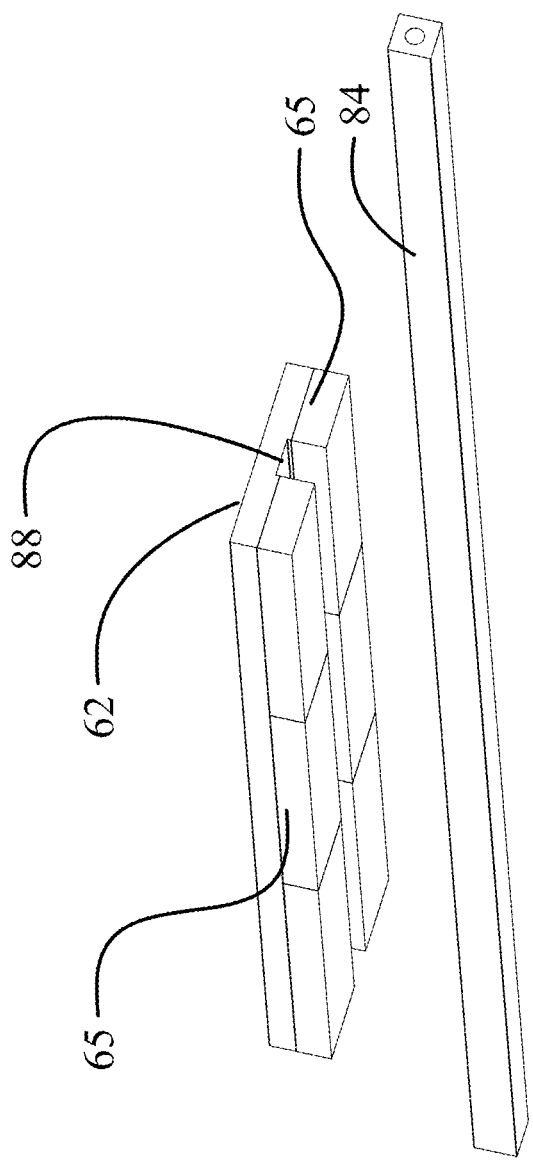
FIG. 12 is an exploded partial view of elements of the translator module.
Figure 13:
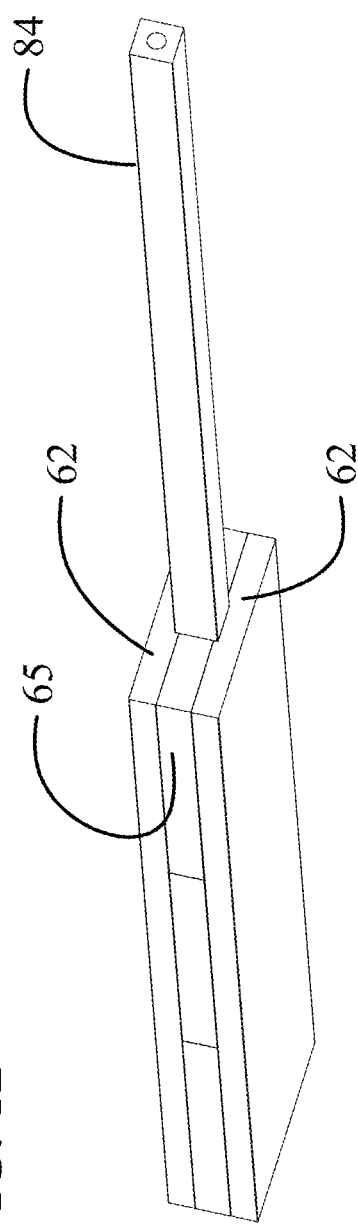
FIG. 13 is a partially assembled view of the translator module.

As seen in FIGS. 12 and 13, the three magnets 65 in each segment 86 are joined with the steel lamination 62 which may include a relief 88 sized to receive the pole bar 84 for added stability. An opposing lamination 62 is then joined on the pole bar sandwiching the magnets 65. In the exemplary implementation the magnets 65 are adhered to the laminations 62 and pole bar 84 at abutting surfaces with an adhesive which minimizes disruption of the magnetic fields of the magnets. The magnetic poles of the magnets are oriented in the direction of travel of the translator 54 as indicated by arrow 58. For the example implementation, the polarity alternates with each translator module.

Figure 14:
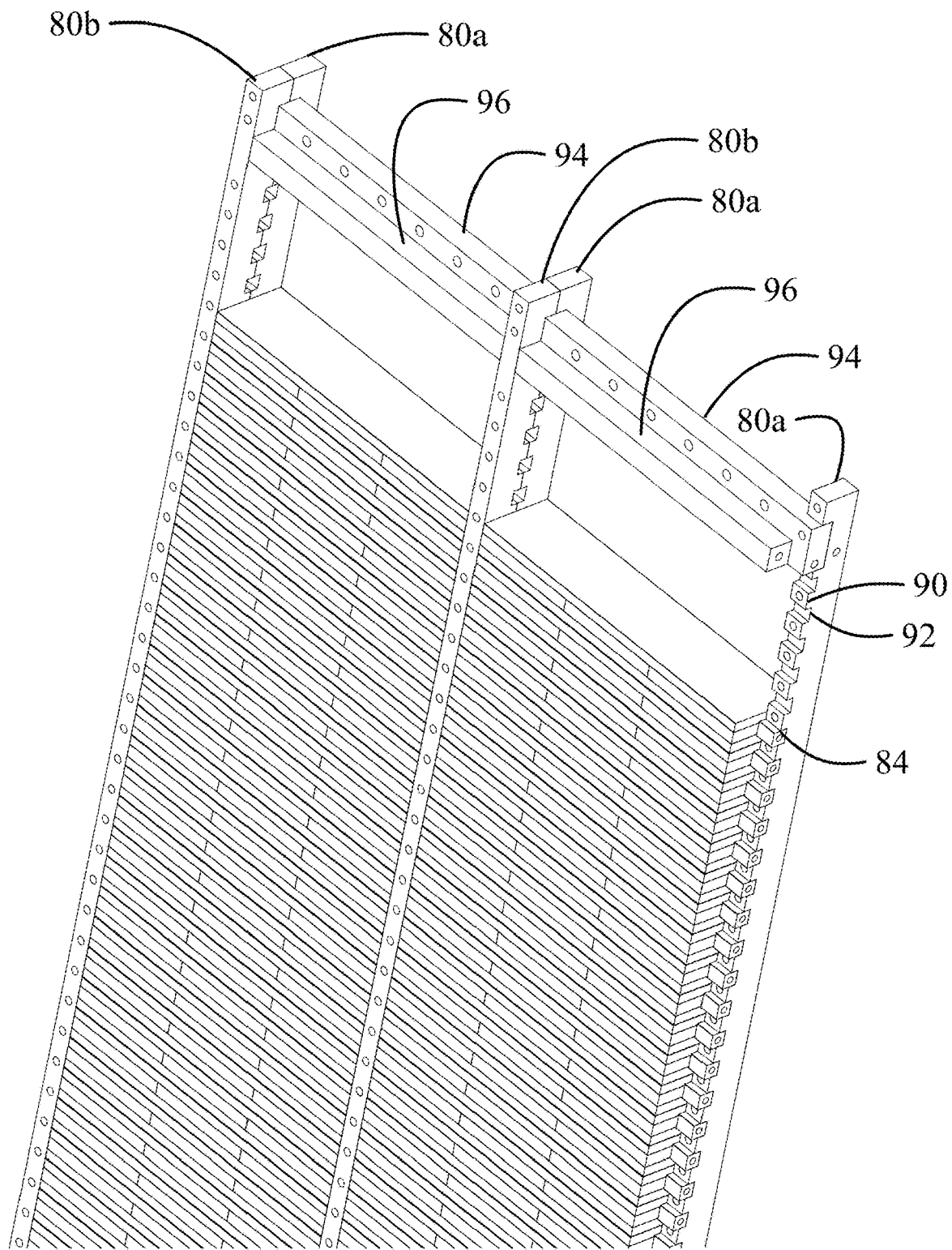
FIG. 14 is a pictorial representation of the translator in a partially assembled condition.
Figure 15:
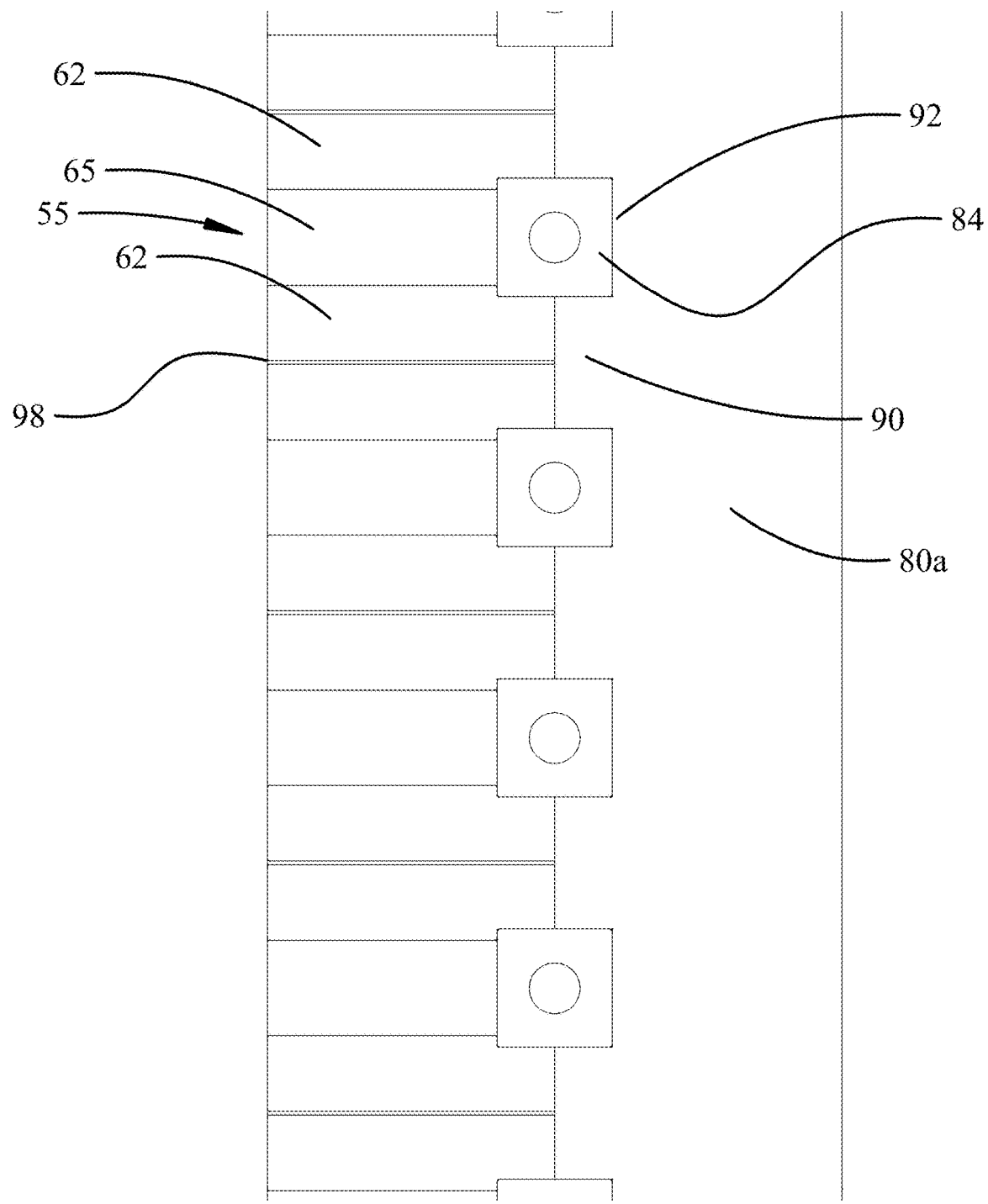
FIG. 15 is an expanded view of the translator modules as supported in the finger bar elements.

Assembly of the translator modules 55 is accomplished as shown in FIGS. 14 and 15. For the exemplary implementation, the pole bars 84 are quadrilateral in cross section and the finger bars 80 are split in mating finger bar halves 80a and 80b. The finger bar halves 80a, 80b have alternating rectangular teeth 90 and rectangular reliefs 92. The alternating teeth 90 engage teeth on the opposing finger bar half in joined pairs and the reliefs 92 receive the pole bars 84. Pairs of the joined finger bar halves 80a, 80b longitudinally and transversely support the translator modules 55 at the outer terminations of the modules and intermediate the segments of the modules. Engagement of the quadrilateral pole bars 84 in the rectangular reliefs 92 inhibits rotation of the translator modules 55. The finger bar halves 80a, 80b engage longitudinal end bars 94 and transverse supports 96 for enhanced rigidity of the translator 54. As seen in the expanded side view of FIG. 15, the translator modules are supported in the finger bar halves 80a, 80b with relief gaps 98.

Figure 16:
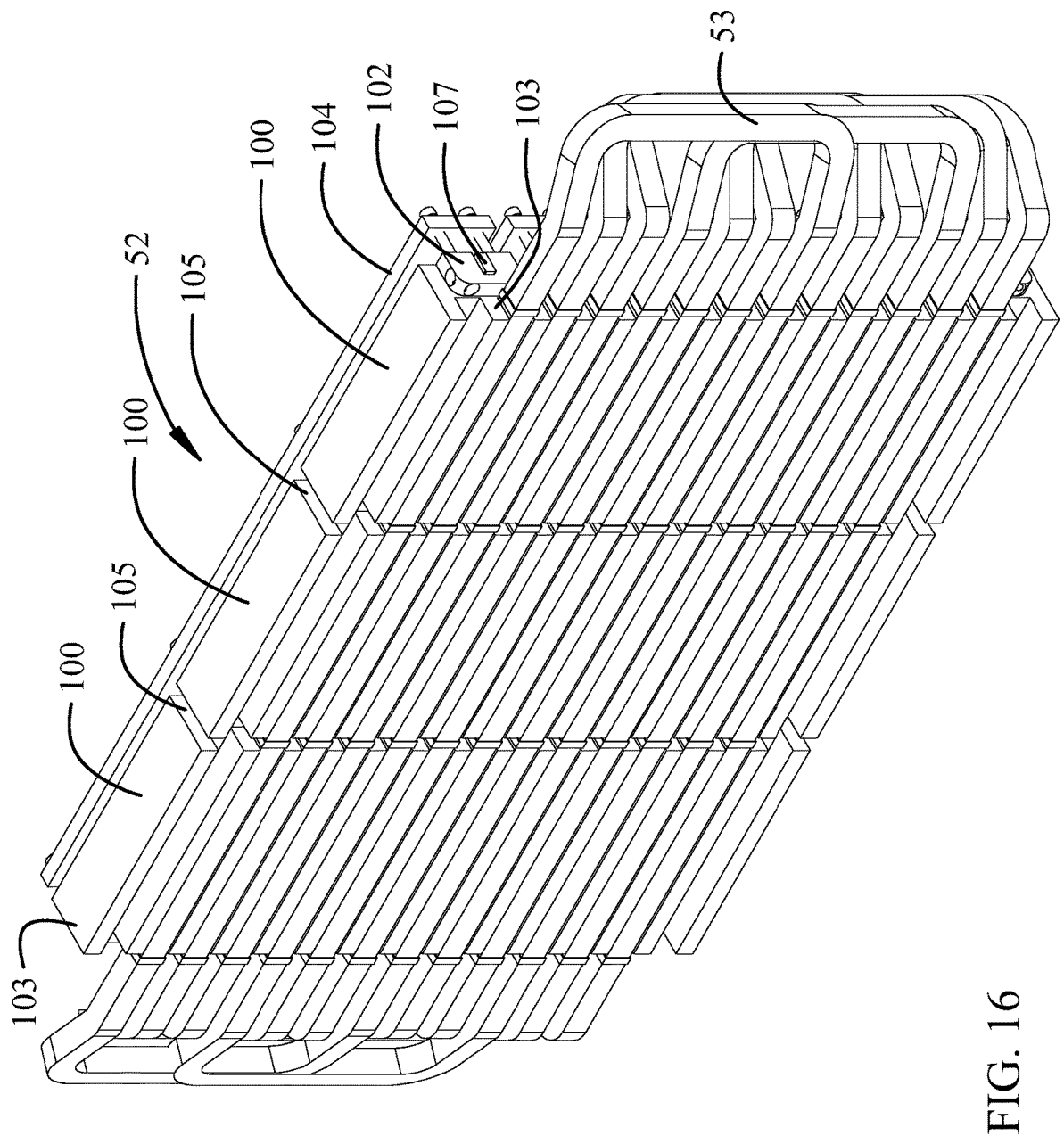
FIG. 16 is a pictorial representation of one stator.
Figure 17:
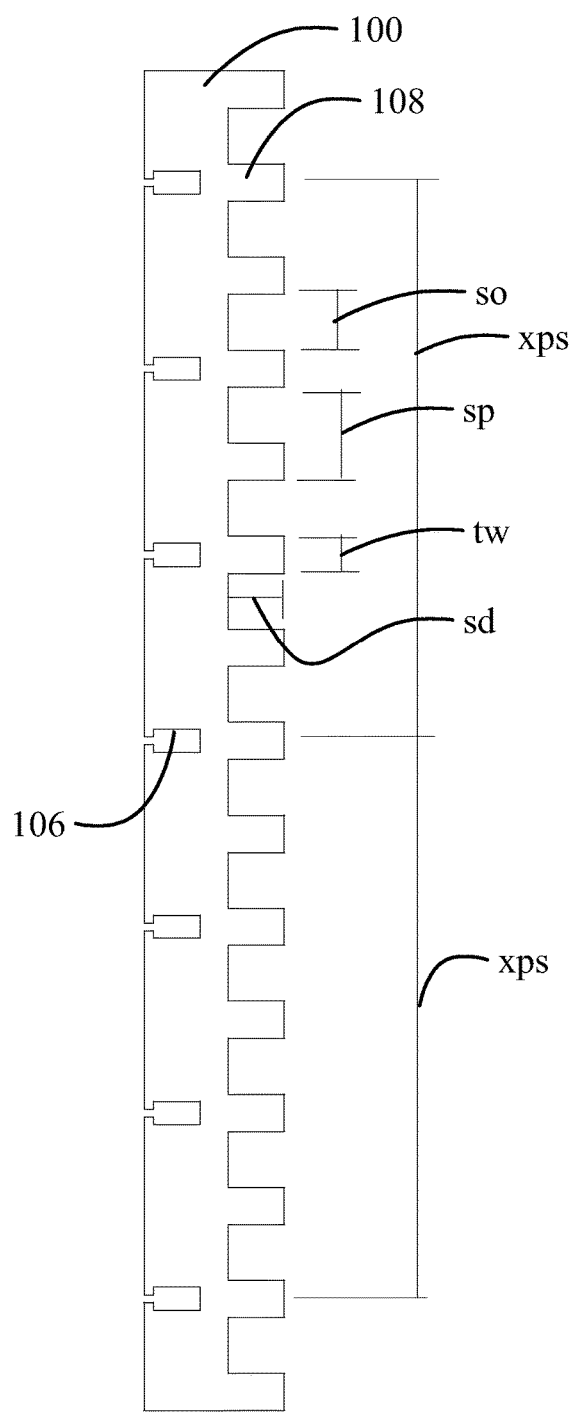
FIG. 17 is a side view of a stator core.
Figure 18:
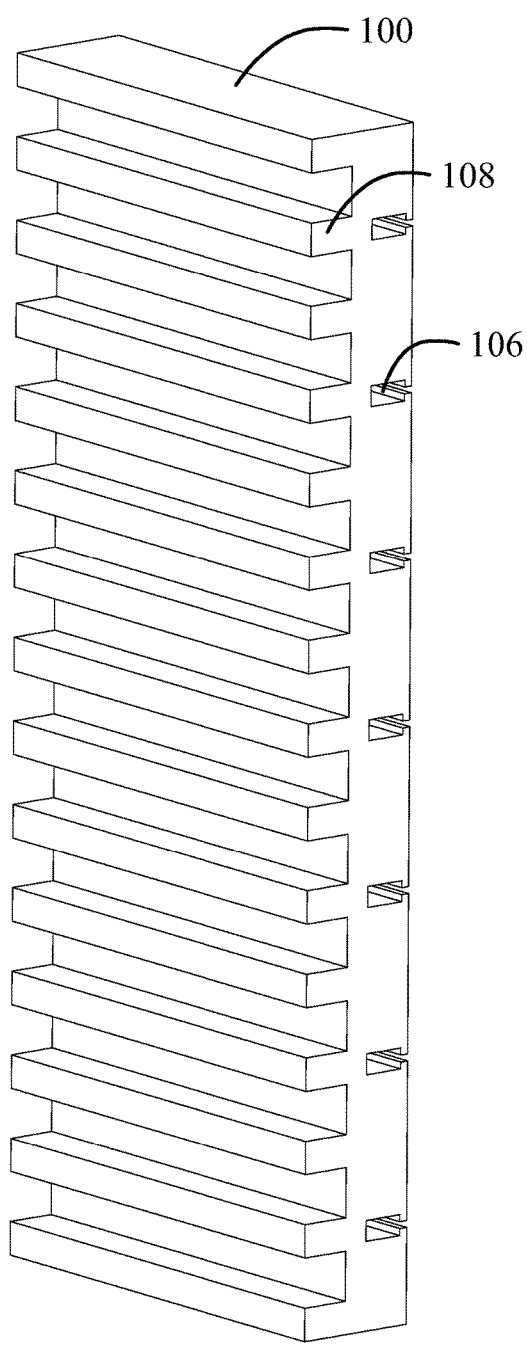
FIG. 18 is a pictorial representation of the stator core.

The stators 52 are described in detail with respect to FIGS. 16-18. The stators 52 have a plurality of core sections 100 matching the plurality of segments 86 in the translator modules 55. The core sections 100 are supported with end plates 102 connected at the lateral edges 103 of the cores and the intermediate segment gaps 105. Lateral support bars 107 extend laterally from the end plates 102 through channels 106 in the stator core sections 100 (seen in FIGS. 17 and 18). For the exemplary implementation, the end plates 102 are provided proximate each tooth 108 intermediate the open slots 64 of each core section 100. Lateral support bars extend from every second end plates 64 vertically on the core sections 100. The end plates 102 are engaged on a back plate 104 to provide lateral rigidity. The back plates additionally secure the stators 52 to the stator supports 68a and 68b.

As seen in FIGS. 16 and 17, the exemplary implementation of the VPMLG employs a 14 slot stator, with a three phase, active (wound region) Q=2 stator slots per pole per phase stator structure (12 active slots), which employs full pitch phase windings, where Q is the value of the balanced three phase winding set number of slots per pole per phase. For the example translator, the translator magnet pole pitch is xp (seen in FIG. 9) and the magnet longitudinal (magnetized direction or thickness) length is xm (seen in FIG. 11). The single segment stator winding pole pitch xps is 11*xp, the active 2-pole longitudinal length of the stator 52 is then 2*xps. The full stator segment length includes two extra (unused) tooth/slot pitch lengths, one at each end of the segment, to mitigate magnetic end effects. The stator slot/tooth pitch sp is equal to xps/(3*Q)=xps/6. The open, rectangular stator slots have longitudinal width (opening) so, and depth (y-direction) sd. The uniform width of the stator teeth tw is then spso. The stator coils are single layer, three phase, integral-slot stator windings, represented as elements 51 in FIG. 16. These coils interact with the magnetic field induced by the translator module magnets 65. For an exemplary implementation, pitch values of xp=32.72 mm and xps=360 mm are employed providing values for proportional parameters of xm=12.5 mm, so=36 mm, sp=60 mm and tw=24 mm. In alternative implementations, the pitch values may range from 50% to 200% of the example values. The value so/sp=0.6 is employed in the example implementation but may range in alternative implementations from 0.4 to 0.8.

The structure of the exemplary implementation places stator winding currents in open slots of the stators 52, with a slot opening value of so providing a slot fraction sf=so/sp=0.6. The slot copper current density is dependent on the slot depth with the winding currents remaining constant. In the example implementation of the VPMLG, the specific values of slot opening so and slot depth sd have been determined such that the $11^{th}$ harmonic component Hxgc11 of the air gap magnetic field Hx is approximately five times the value of the fundamental or $1^{st}$ harmonic component Hxgc1. This is not an intuitive and/or expected result of the configuration. The presence of the open slots, of sufficient size, in both slot opening so and in slot depth sd, "enhances" the attainable slot harmonic component values of Hx within the machine air gap due to the stator winding currents. Alternative implementations employing slot depths to create slot currents generating harmonic components at odd harmonics not divisible by 3, such as the $13^{th}$ harmonic may provide enhanced performance at other translator sizes or operating speeds.

In certain implementations a designated number of the translator modules 55 at each longitudinal end of the translator 54 (designated as 55' in FIG. 8) may be constructed with non-magnetic material replacing the magnets 65 in each module for a portion of the excess length 59 to provide a second portion of the plurality of translator modules. The overall length of the translator 54, excess length 59 and number of non-magnetic translator modules 55' are then implemented to provide a longer passive stroke than active stroke of the translator 54 between the stators 52.

Figure 19:
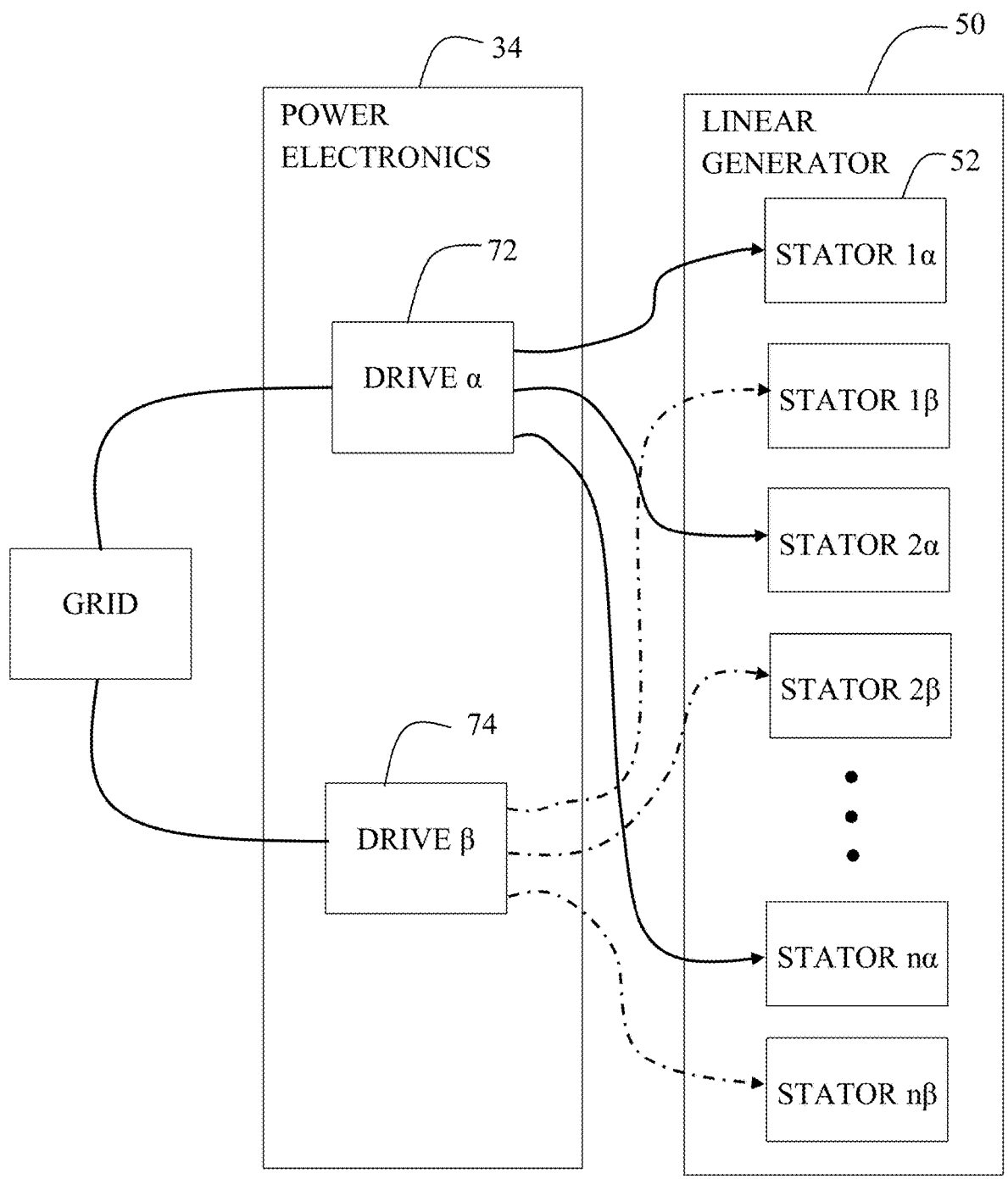
FIG. 19 is a diagram of the power electronics and stator connections.

In one implementation of this invention the linear generator 50 is driven by the low level controller 32 and power electronics 34 as a single machine. In an alternate implementation the stators employed in the linear generator are driven individually or in sub-sets to achieve improved thermal operating characteristics. An example arrangement of two power electronics drives 72 and 74 operating two sets of a number of linear generator stators (identified as α and β) is depicted in FIG. 19. In this arrangement the two subsets (1 α, 2 α . . . n α and 1 β, 2 β . . . n β) of stators 52 supported in the opposing stator supports 68a and 68b, can be controlled independently to drive a single translator 54 between the two stator supports. Drive α 72 is shown driving the α stators in parallel and drive β 74 is shown driving the β stators in parallel schematically in FIG. 19 which may be accomplished by mechanical connection or by controlled electrical connection. Alternatively, the mechanical connection or controlled electrical connection may be employed to drive the stators 52 in series.

Figure 20:
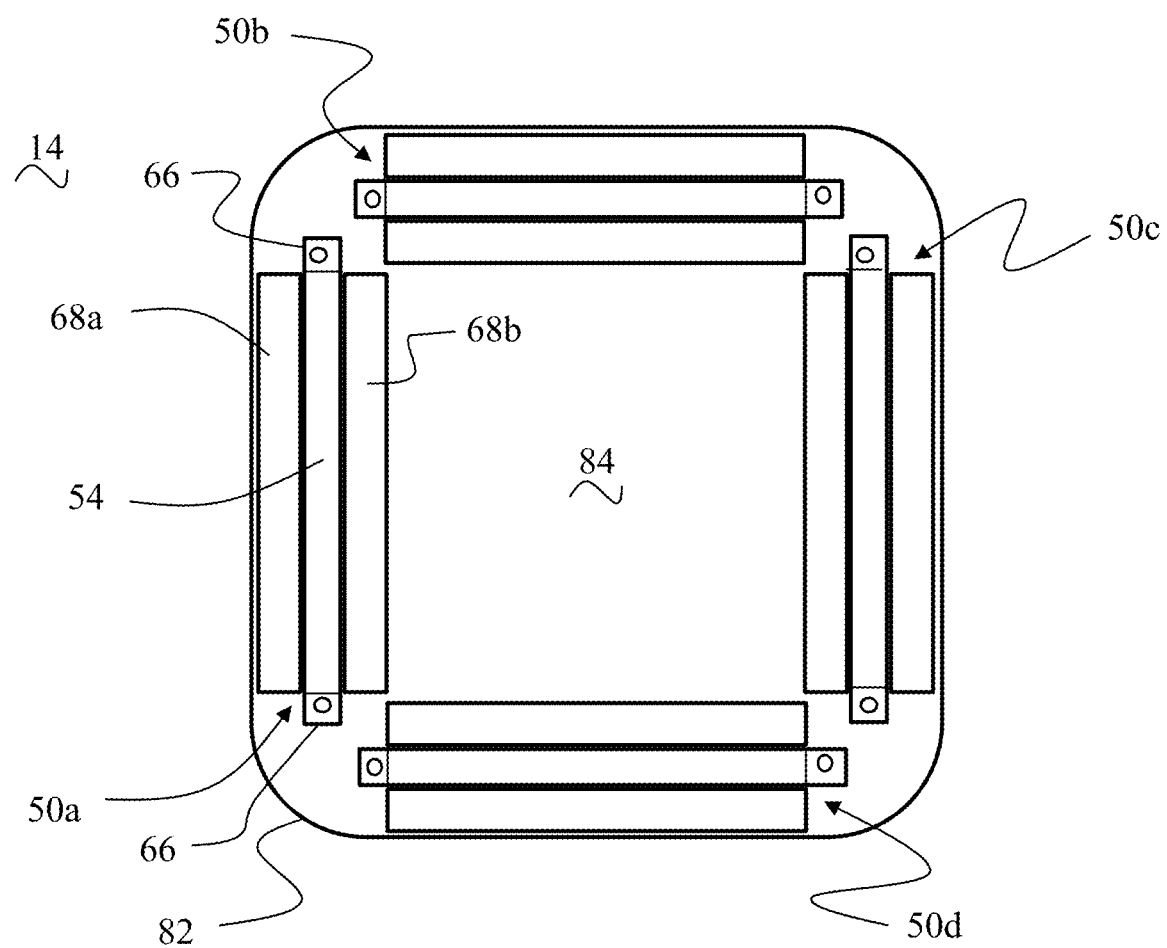
FIG. 20 is a drawing depicting an example physical arrangement of linear generators within a sealed housing from a top view.

As show in FIG. 20 a plurality of linear generators 50a, 50b, 50c and 50d may be supported within the housing 82 the reaction body_16. The orientation and number of linear generators may be varied to accommodate space available within the reaction body 16 and to take advantage of various cooling scenarios for the stators. The arrangement of stators supports 68a (outside) and 68b (inside) in the example shown in FIG. 8 would result in greater cooling capability for the outer stators that can conduct heat out to the water 14 through the housing 82 of the reaction body 16 compared to the inner stators that only have an internal volume 84 containing air with which to cool. The low level controller 32 can use a thermal sensor input, T, from the linear generator sensors 31 to determine how much current to apply to each of the stator sets in order to achieve to desired change in power take-off force commanded by the high level controller 30 while maintaining thermal equilibrium between the modules of the stators 52 on the outside and inside stator supports and 68a. The overall result of this is an improved capability of the whole PTO system as all stators 52 are no longer limited by the stators with the poorest cooling capability.

The implementation shown in FIG. 20 while shown with the translators 54 of the linear generators 50a, 50b, 50c and 50d arranged in parallel within the housing 82 of the reaction body 16, the linerar generators may be electrically connected in parallel or in series as previously described. In certain implementations, the linear generators may be aligned and mechanically interconnected in series.

While the invention has been described with reference to specific implementations, it will be understood by those skilled in the art that various changes may be made, and equivalents may be substituted for elements thereof without departing from the true spirit and scope of the invention. In addition, modifications may be made without departing from the essential teachings of the invention as defined in the following claims.

What is claimed is:

1. A Vernier permanent magnet linear generator comprising:
  a translator having
    a plurality of translator modules oriented in a vertical array, at least a portion of said plurality of translator modules having permanent magnets with a magnet pole pitch xp;
    supports at lateral edges of the plurality of translator modules;
    a rod connected to the supports for attachment to a driving element, said driving element reciprocating the translator in a longitudinal direction;
  two stators supported on a reaction body, said stators oppositely spaced from the vertical array of translator modules by an air gap and offset by a one half slot pitch, said stators having three phase integral-slot stator windings with a stator winding pole pitch xps magnetically interacting with a magnetic field induced by the permanent magnets;

wherein, xps divided by xp is an odd integer, not evenly divisible by 3.

2. The Vernier permanent magnet linear generator as defined in claim 1 wherein at least the portion of the plurality of translator modules each comprise electrical steel laminations oppositely engaged on the permanent magnets.

3. The Vernier permanent magnet linear generator as defined in claim 1 wherein the translator has an excess length at each longitudinal end beyond the stators and a second portion of the plurality of translator modules at each longitudinal end of the translator have a non-magnetic material replacing the magnets in each module for a portion of the excess length.

4. The Vernier permanent magnet linear generator as defined in claim 3 wherein the portion of the excess length is greater than a length of the at least the portion of said plurality of translator modules having the permanent magnets.

5. The Vernier permanent magnet linear generator as defined in claim 1 wherein the driving element comprises a floating body in a wave energy converter and the reaction body engages the floating body with the said reaction body static or oscillating out of phase relative to the floating body.

6. A Vernier permanent magnet linear generator comprising:
   a translator having
      a plurality of translator modules oriented in a vertical array, at least a portion of said plurality of translator modules having permanent magnets with a magnet pole pitch xp, at least a portion of the plurality of translator modules each comprising electrical steel laminations oppositely engaged on the permanent magnets and wherein the steel laminations and the permanent magnets are joined on a pole bar in a plurality of segments with the plurality of magnets in each segment;
      supports at lateral edges of the plurality of translator modules;
      a rod connected to the supports for attachment to a driving element, said driving element reciprocating the translator in a longitudinal direction; and
   two stators supported on a reaction body, said stators oppositely spaced from the vertical array of translator modules by an air gap and offset by a one half slot pitch, said stators having three phase integral-slot stator windings with a stator winding pole pitch xps magnetically interacting with a magnetic field induced by the permanent magnets;
wherein, xps divided by xp is an odd integer, not evenly divisible by 3.

7. The Vernier permanent magnet linear generator as defined in claim 6 wherein the pole bar has a quadrilateral cross section and further comprising a plurality of pairs of joined opposing finger bar halves each opposing finger bar half having alternating rectangular teeth and rectangular reliefs, the alternating teeth on one of said opposing finger bar halves engaging alternating teeth on a second of said opposing finger bar halves and the alternating rectangular reliefs receiving the pole bars, each of the pairs of joined opposing finger bar halves longitudinally and transversely supporting the translator modules at an outer termination of each translator module or intermediate the segments of the modules.

8. The Vernier permanent magnet linear generator as defined in claim 7 wherein the finger bar halves engage longitudinal end bars and transverse supports for enhanced rigidity of the translator.

9. The Vernier permanent magnet linear generator as defined in claim 6 wherein each of the two stators comprises a plurality of core sections matching the plurality of segments in the translator modules each core section having 12 slots with a slot opening so with a tooth intermediate each slot having a tooth width tw.

10. The Vernier permanent magnet linear generator as defined in claim 9 further comprising
   end plates connected at lateral edges of each core section and at gaps intermediate adjacent core sections, the end plates engaged on a back plate to provide lateral rigidity, the back plate securing the stators to stator supports.

11. The Vernier permanent magnet linear generator as defined in claim 10 further comprising lateral support bars extending laterally from the end plates through channels in the stator core sections.

12. The Vernier permanent magnet linear generator as defined in claim 11 wherein the end plates are provided proximate each tooth intermediate each slot of each core section and the lateral support bars extend from every second end plate vertically on each core section.

13. The Vernier permanent magnet linear generator as defined in claim 9 wherein an active longitudinal length of each stator is 2*xps where xps is a single segment stator winding pole pitch and xps=11*xp where xp is a translator magnet pole pitch.

14. The Vernier permanent magnet linear generator as defined in claim 13 wherein a stator slot/tooth pitch sp is defined by sp/(3*Q)=xps/6 where Q is a value for a balanced three phase winding set number of slots per pole per phase.

15. The Vernier permanent magnet linear generator as defined in claim 14 wherein a slot fraction sf=0.6 comprises a ratio of a slot opening so to the slot pitch sp.

16. The Vernier permanent magnet linear generator as defined in claim 14 wherein a slot fraction sf being 0.4≤sf≤0.8 comprises a ratio of a slot opening so to a slot pitch Sp.

17. The Vernier permanent magnet linear generator as defined in claim 14 wherein, the translator magnet pole pitch xp=32.72 mm and the single segment stator winding pole pitch xps=360 mm and a magnet longitudinal length xm=12.5 mm, a slot opening so=36 mm, the slot pitch sp=60 mm and the tooth width tw=24 mm.

18. The Vernier permanent magnet linear generator as defined in claim 14 wherein xp is a range of 50% to 200% of 32.72 mm and xps is a range of 50% to 200% of 360 mm.

19. A wave energy converter comprising:
   a floating body;
   a reaction body engaging the floating body, said reaction body static or oscillating out of phase relative to the floating body;
   a translator having
      a plurality of translator modules oriented in a vertical array, a least a portion of said plurality of translator modules having permanent magnets with a magnet pole pitch xp;
      supports at lateral edges of the plurality of translator modules;
      a rod connected to the supports for attachment to the floating body, said floating body reciprocating the translator in a longitudinal direction;

two stators supported on the reaction body, said stators oppositely spaced from the vertical array of translator modules by an air gap and offset by one half slot pitch, said stators having three phase integral-slot stator windings with a stator winding pole pitch xps magnetically interacting with a magnetic field induced by the translator permanent magnets;

wherein, xps divided by xp is an odd integer, not evenly divisible by 3.

* * * * *

UNITED STATES PATENT AND TRADEMARK OFFICE
CERTIFICATE OF CORRECTION

PATENT NO. : 10,871,141 B2
APPLICATION NO. : 16/666032
DATED : December 22, 2020
INVENTOR(S) : Alan L. McCall, Patrick J. McCleer and Gerald R. Shannon Page 1 of 1

It is certified that error appears in the above-identified patent and that said Letters Patent is hereby corrected as shown below:

In the Specification

Please insert the following after the section entitled REFERENCES TO RELATED APPLICATIONS:
--STATEMENT REGARDING FEDERALLY SPONSORED RESEARCH OR DEVELOPMENT
This invention was made with Government support under DE- EE0007175 awarded by The United States Department of Energy. The Government has certain rights in this invention.--

Signed and Sealed this
Twentieth Day of September, 2022

Katherine Kelly Vidal
*Director of the United States Patent and Trademark Office*